United States Patent
Koseki et al.

(10) Patent No.: US 9,280,332 B2
(45) Date of Patent: Mar. 8, 2016

(54) CODE CONVERTING METHOD, PROGRAM, AND SYSTEM

(71) Applicant: International Business Machines Corporation, Armonk, NY (US)

(72) Inventors: Akira Koseki, Kanagawa-ken (JP); Akihiko Tozawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 13/835,849

(22) Filed: Mar. 15, 2013

(65) Prior Publication Data
US 2013/0298111 A1   Nov. 7, 2013

(30) Foreign Application Priority Data

Apr. 16, 2012   (JP) .................. 2012-093355

(51) Int. Cl.
*G06F 9/44*   (2006.01)
*G06F 9/45*   (2006.01)
(52) U.S. Cl.
CPC ....................... *G06F 8/51* (2013.01)

(58) Field of Classification Search
CPC .............. G06F 8/51; G06F 8/41; G06F 9/514
USPC ........................................... 717/137
See application file for complete search history.

(56) References Cited

U.S. PATENT DOCUMENTS

| | | | |
|---|---|---|---|
| 7,937,694 B2* | 5/2011 | Meijer ................. | G06F 9/4425 717/114 |
| 2008/0046870 A1* | 2/2008 | Nair et al. ..................... | 717/140 |
| 2012/0117551 A1* | 5/2012 | Isard et al. .................... | 717/159 |
| 2013/0132371 A1* | 5/2013 | Bharath et al. ................ | 707/719 |

OTHER PUBLICATIONS

Noll, "Writing an Hadoop MapReduce Program in Python, Sep. 21, 2007, pp. 1-24".*
Watt, "A Technique for Generic Iteration and Its Optimization", Sep. 16, 2006, pp. 76-86.*

* cited by examiner

*Primary Examiner* — Duy Khuong Nguyen
(74) *Attorney, Agent, or Firm* — Cantor Colburn LLP

(57) ABSTRACT

A computer-implemented method, system, and article of manufacture for processing a programming language, which is able to describe data conversion of data input by an iterator. The method includes: converting iterator code of the programming language to a generator code in an intermediate language that includes a generator as an operator; reading a consumer side code; and overwriting code by inline substitution between the consumer side code and the generator code.

16 Claims, 6 Drawing Sheets

(a)

Apply present invention (b)

CODE CONVERTING METHOD, PROGRAM, AND SYSTEM

CROSS-REFERENCE TO RELATED APPLICATION

This application claims priority under 35 U.S.C. §119 from Japanese Patent Application No. 2012-093355 filed Apr. 16, 2012, the entire contents of which are incorporated herein by reference.

BACKGROUND OF THE INVENTION

1. Field of the Invention

The invention relates to the field of code converting. More particularly, the present invention relates to a method for increasing execution rate of iterator processing code in a programming language by converting a code written in one programming language to another programming language.

2. Description of the Related Art

As computer hardware, such as processors and disk devices, become less expensive, a mechanism has been proposed that processes large amounts of data at high speed by storing large amounts of data on a disk, and mutually connecting a plurality of computer system devices. One such mechanism is MapReduce, developed by Google®.

A developer can execute large-scale processing with minimal effort by using MapReduce and relying on MapReduce for the difficult sections with parallel processing.

Later, the Hadoop® project was launched with open source package MapReduce. Jaql, Pig, and Hive and the like were developed as programming languages that are used on Hadoop® MapReduce. These programming languages deal with mechanisms called iterators. When an iterator is used, large amounts of data can be processed without being stored in memory. The data being processed is accessed by the iterator and then converted. The conversion of the data is referred to as iterator conversion. Note, refer to http://code.google.com/p/jaql/wiki/l0; http://pig.apache.org/; and http://hive.apache.org/ for information concerning Jaql, Pig, and Hive respectively.

However, the iterator obtained by this type of conversion can have complicated controls and states, and easily optimizing with an existing compiler, such as a JIT compiler, can be difficult.

In other words, an existing compiler analyzes and optimizes the data flow while determining the transition of the program based on a control flow graph, but transition of the iterator is determined by the internal states of the iterator, so an existing compiler will have difficulty accurately determining the data flow.

For example, the expression iter-> expand e calculates an internal iterator sequence e(x0), e(x1), . . . for each of the elements x0, x1, . . . obtained from the external iterator iter, and returns a result iterator that links the sequences expressed by each. This result iterator keeps track of the states of the external iterator as well as the states as to what is the internal iterator that is currently being viewed.

The condition expression if cond then iter1 else iter2 has the evaluation results of cond as a state.

The iterator generated from the constant size array expression [e0, e1, . . . ] has the index of the internal array as a state. This leads to complex controls and states inside the result iterator.

Specifically, when processing using the Jaql iterator statement:

$out = $in -> expand [$. a, $. b, $. c, $. d]
    -> filter ($ > 0),

The iterator result $out is expressed by a state transition diagram as shown in FIG. 1. If for example, $out. next ( ) ended the previous time by reading $.b, then the next time reading will begin from $.c. This type of processing is difficult to understand for a conventional compiler because the call site of $out.next ( ) is the location where the control flow joins.

With XML SAX API described in http://docs.oracle.com/javase/1.4.2/docs/api/org/xml/sax/package-summary.html, the input obtained as an event sequence is processed by the event handler. However, this method cannot easily be applied to Jaql.

Furthermore, it is also known that the XQuery compiler Galax at http://galax.sourceforge.net/compiler/ will access data that has not been materialized by the iterator, and thus processing is complex. More specifically, complex iterator processing code is required for accessing the data, and optimizing the compiler can be difficult.

SUMMARY OF INVENTION

According to one aspect of the present invention, a computer-implemented method is provided for processing a programming language able to describe data input by an iterator. The method includes: converting iterator code of the programming language to a generator code in an intermediate language that includes a generator as an operator; reading a consumer side code; and overwriting code by inline substitution between the consumer side code and the generator code.

According to another aspect of the present invention, a non-transitory article of manufacture is provided which tangibly embodies computer readable instructions that when implemented, causes a computer to perform the steps of the computer implemented method for processing a programming language able to describe data conversion of data by input by an iterator.

According to still another aspect of the present invention, a computer implemented system is provided for processing a programming language able to describe data of data input by an iterator. The system includes: a memory; a processor communicatively coupled to the memory; and a module communicatively coupled to the memory and the processor so that the module is configured to perform the steps of the computer implemented method for processing a programming language able to describe data conversion of data by input by an iterator.

DETAILED DESCRIPTION OF THE PREFERRED EMBODIMENTS

Figure 1:
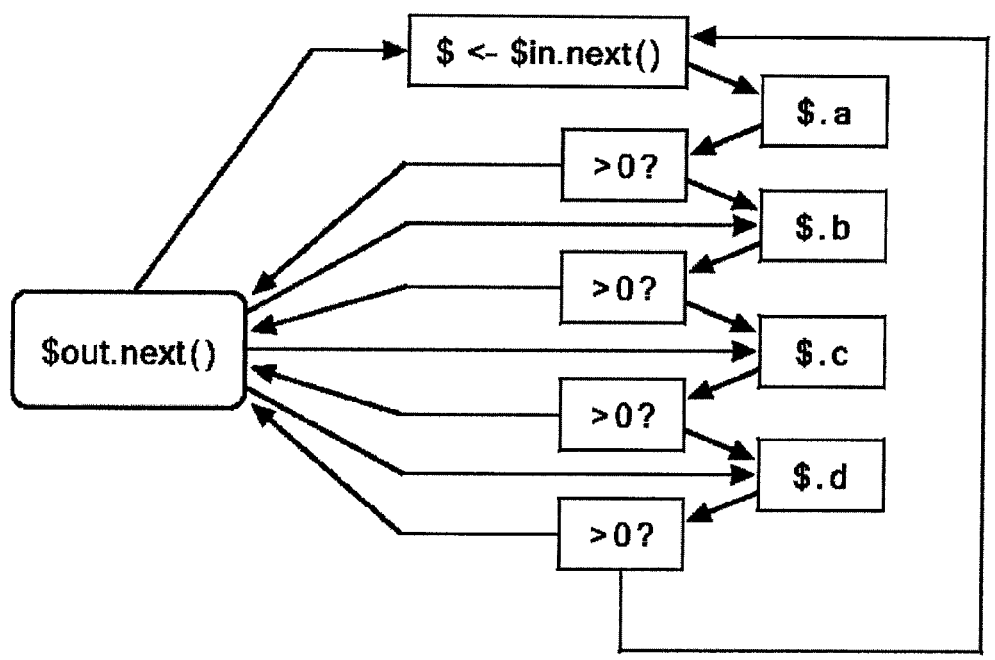
FIG. 1 is a diagram schematically illustrating an example of iterator processing.

The present invention accelerates execution of iterator processing code in a programming language, provides a method that controls an increase in iterator internal states, and generates optimal execution code. This is accomplished by converting iterator processing code to an intermediate language that has a generator, and expressing the data conversion by generator conversion. The resulting code is then optimized by a complier.

In other words, data conversion is expressed by a generator using a conversion program according to an embodiment of the present invention. For example, input iterator in is converted to a generator:

```
for (x : in) {yield x}.
iter -> expand e is converted to a generator for (x : iter) {for (y : e (x)) {yield y}}.
Condition expression if e then iter1 else iter2 is converted to if e then for (x : iter1) {yield x} else for (y : iter2) {yield y}.
Array [e0, e1, ...] is converted as a generator: yield e0; yield e1; ... .
```

Next, the conversion program according to the present invention applies inline-expansion to generator expressions occurring in the code of the intermediate language. Generator inlining for statement "for (x:g) {e}" is achieved by replacing the yield expressions occurring in the definition of g with e (i.e., consumer code is inlined into the generator code), while the statement "for (x:g) {e}" itself is replaced by the definition of g (i.e., generator code is inlined into the consumer code). If the final consumer of the result iterator out, such as "for (x:out) { ... }," is available, the result code from inlining can be processed by runtime without supporting generators.

If for some reason, the final consumer of the result iterator cannot be obtained, the conversion result still needs to be presented in the iterable form. If the runtime does not support generators, then the result code will need to be reconverted again to an iterator. If this is the case, a mechanism for saving and loading the local variable frame will be required during yield, but a control mechanism that is simpler than the original iterator can be achieved by compiling each yield continuation as an entry for different functions.

With a Jaql processing system, a program that consumes the result iterator in a form of "for (x:g) {e}" can be obtained.

The source program is converted into a code of the intermediate language, first, by using generators, to which inlining expansion is then applied and finally by compiling with the compiler that was created for the intermediate language. At this time, the compiler appropriately uses existing compiler optimization.

The states originally embedded in the iterator are mapped to the program points of the program obtained after the generator inlining. Therefore, the compiler can apply more elaborated optimization for each code at different state, using the existing optimization methods based on a control flow graph.

Embodiments of the present invention will now be described below with reference to the accompanying drawings. In the following description, elements that are identical are referenced by the same reference numbers in all of the drawings unless otherwise noted. The configuration and processing explained here are provided as preferred embodiments, and it should be understood that the technical scope of the present invention is not intended to be limited to these embodiments.

Figure 2:
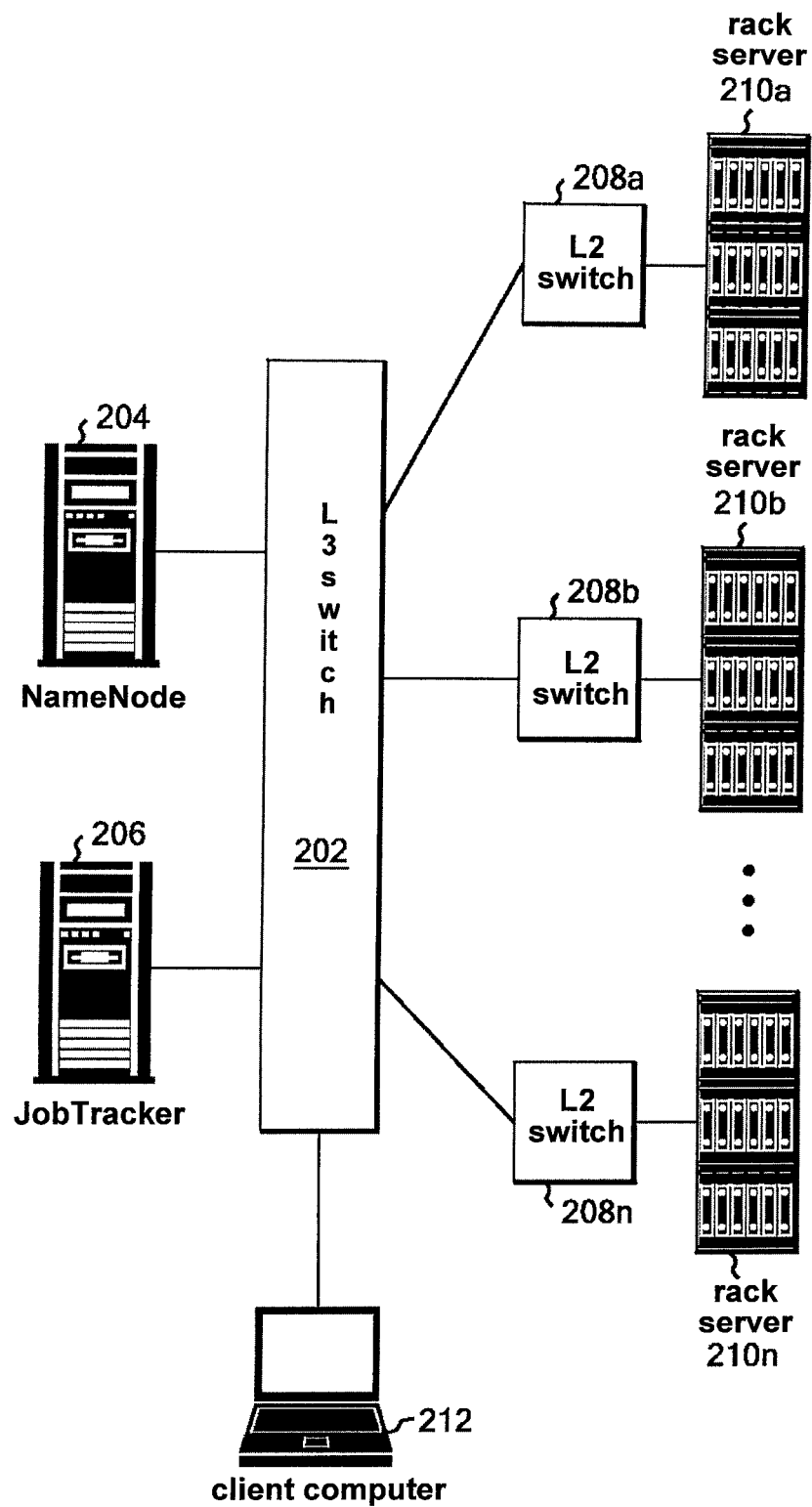
FIG. 2 is a block diagram of a hardware configuration based on Hadoop® for performing an embodiment of the present invention.

FIG. 2 is a block diagram illustrating an example of a hardware configuration for performing an embodiment of the present invention. The configuration of FIG. 2 is executed in accordance with Hadoop®, but this is not a restriction.

Referring to FIG. 2, L3 switch 202 connects NameNode 204 which is a master server characteristic to Hadoop® with JobTracker 206. L3 switch 202 is responsible for transfer processing of network layer (layer 3) data in an OSI reference model.

Rack servers 210a, 210b, . . . , 210n are also connected to L3 switch 202 through L2 switches 208a, 208b, . . . , 208n. Rack servers 210a, 210b, . . . , 210n have a structure where a plurality of thin servers are stacked, and L2 switches 208a, 208b, . . . , 208n connect each of the stacked servers to L3 switch 202 as a router. L2 switches 208a, 208b, . . . , 208n are also referred to as a switching hub, and are devices that operate on the data link layer.

Rack servers 210a, 210b, . . . , 210n perform the role of a slave server for Hadoop®, or, in other words, a task tracker and DataNode.

L3 switch 202 is also connected to client computer 212 that outputs processing requests to the master server. In FIG. 2, only one client computer is illustrated, but it is also possible to connect a plurality of client computers and to receive processing requests from each.

NameNode 204 manages the Hadoop distributed filesystem (HDFS) with rack servers 210a, 210b, . . . , 210n as DataNodes.

JobTracker 206 performs MapReduce processing on the HDFS with rack servers 210a, 210b, . . . , 210n as TaskTrackers.

Although not a restriction, IBM® Power 780 can be used as a preferable computer hardware system for NameNode 204 and JobTracker 206. Furthermore, each of the servers that are stacked in rack server 210a, 210b, . . . , 210n can be an IBM® Power 710 Express.

The operating system installed in these server hard disk drives is preferably Linux®, and a Java® program is preferably installed in order to build a Java® execution environment in Linux®.

The Hadoop® package is installed in NameNode 204 and JobTracker 206. Although not a restriction, the IBM® distribution of Apache™ Hadoop® is preferably the package that is installed.

Client computer 212 can be a normal personal computer containing memory, CPU, hard disk drive, and communication interface. The hard disk drive of client computer 212 can have Linux® installed as the operating system, and can also have a Java® program installed in order to build a Java® executable environment.

Client computer 212 performs a role of a JobClient in Hadoop®. In other words, the role of client computer 212 includes requesting a MapReduce job to JobTracker 206, and to transfer data to the HDFS for processing the MapReduce job.

A configuration that includes NameNode 204, JobTracker 206, rack servers 210a, 210b, . . . , 210n, and the Hadoop® package installed in each is also referred to as a Hadoop® framework.

FIG. 2 is a typical Hadoop® configuration, and provides a client computer 212 that performs the role of a JobClient in addition to JobTracker 206, but in a preferred embodiment of the present invention, JobTracker 206 can perform the role of the JobClient itself.

Figure 3:
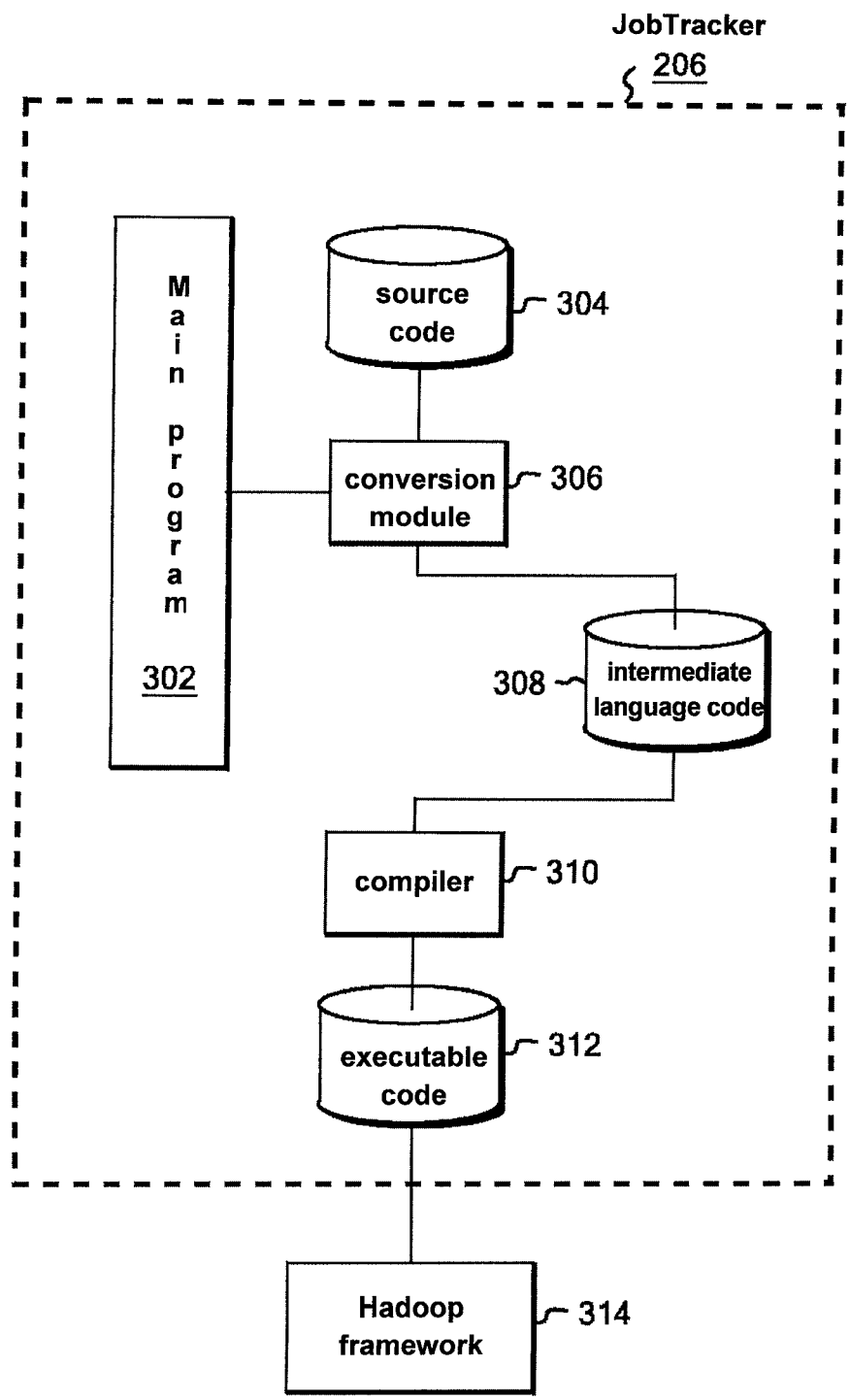
FIG. 3 is a block diagram of a function configuration for performing an embodiment of the present invention.

FIG. 3 is a block diagram illustrating the functional configuration for performing the role of a JobClient that is stored on the hard disk drive in JobTracker 206. Referring to FIG. 3, main program 302 begins processing the JobClient, or has a function for controlling the process.

Although not shown in the drawings, a Jaql processing system is installed in JobTracker 206. The Jaql processing system has a function that processes the master Jaql source code that was created using a text editor or a program development tool. The processing system compiles the source code into a sequence of smaller code, each expressing a task for MapReduce, and being either allocated in the main memory, or saved to the hard disk drive.

Source code 304 is Jaql source code for each task that has been created in this manner. Conversion module 306 has a function that converts source code 304 to an intermediate language code 308. The conversion function has (1) a function that generates an intermediate language code 308 that converts the iterator to a generator, and (2) a function that performs the inline expansion of the generator in intermediate language code 308. Intermediate language code 308 is not necessarily an existing programming language, and can be designed specifically for this process. However, intermediate language code 308 must support generators.

Note, the generator is one mechanism of the programming language, and is supported by programming languages, such as Python, C#, C++, XL, PHP. Typically, a language that provides a generator has statement that is akin to return statement, such as yield statement. The difference between return and yield is that with return, the state is not saved, but yield saves the state even when returned to the caller side, and during a subsequent call, the execution can be continued with the saved state from the subsequent position of the previous yielded position. With the present invention, a temporary conversion is made to an intermediate language that supports generators, so the original language does not need to support generators.

Compiler 310 compiles intermediate language code 308 that was written to the hard disk drive as the conversion result of conversion module 306 interprets Java® byte code or Hadoop® framework 314, and either temporarily allocates executable code 312, which is an executable binary code to main memory, or writes to the hard disk drive.

The process flow is as shown below. In other words, the part that performs the role of the JobClient of JobTracker 206 is started, and requests a job from JobTracker 206. Next, as described above, the Jaql processing system in JobTracker 206 compiles the Jaql source code into small source codes that express each of the tasks for MapReduce, and either allocates to main memory or saves to the hard disk drive.

Each of the above codes for MapReduce task is temporarily converted to intermediate language code 308 by conversion module 306, and intermediate language code 308 is compiled to executable code by compiler 310. If the data on the HDFS is used as an input, each executable code 312 will correspond to a fragment of an executable program for map and reduce tasks in the MapReduce job.

JobTracker 206 copies the Jaql processing system for distributed processing the fragments of these executable codes, and distributes to each of the Tasktrackers, which are rack servers 210a, 210b, ..., 210n. When tasks are started by the node of each Tasktracker, the copy of the processing system is initiated, and the Tasktracker executes the fragment of executable code 312 that was distributed. FIG. 3 illustrates the case where this type of process is executed on a Hadoop® framework 314.

Instead of compiling the fragments of executable code 312 using JobTracker 206 and transferring to the Tasktracker, it is also possible to install a conversion module 306 and compiler 310 in each of the Tasktrackers, transfer a copy of the Jaql processing system for distributed processing and the fragment of the Jaql source code that was distributed by JobTracker 206 to the Tasktracker, convert the fragment of the Jaql source code to intermediate language code 308 on the Tasktracker side, and then subsequently compiling and executing executable code 312 of the results.

The present embodiment describes rules for converting the Jaql iterator to the generator of the intermediate language.

```
    input iterator in → for (x : in) {yield x}
iter -> transform e → for (x : iter) {yield e(x)}
iter -> expand e → for (x : iter) {for (y : e(x)) {yield y}}
iter -> filter e → for (x : iter) {if (e(x)) yield y}
iter -> union other → for (x : iter) {yield x}; for (x : other) {yield x}
iter -> group by key into agg →
Map m;
for (x : iter) {
    if (m. contains (key (x)) {m. put (key (x), agg(m. get (key(x)), x))}
    else {m. put (key(x), x)}}
for ((k, v) : map) {yield v}
iter -> tee e → for (x : iter) {e(x); yield x}
iter -> top k → int c = 0; for (x : iter) {if (c++ >= k) return; yield x}
if e then iter1 else iter2 →
    if e {for (x : iter1) {yield x}} else {for (x : iter2) {yield x}}
[e0, e1, ..] → yield e0; yield e1; ...
```

Figure 4:
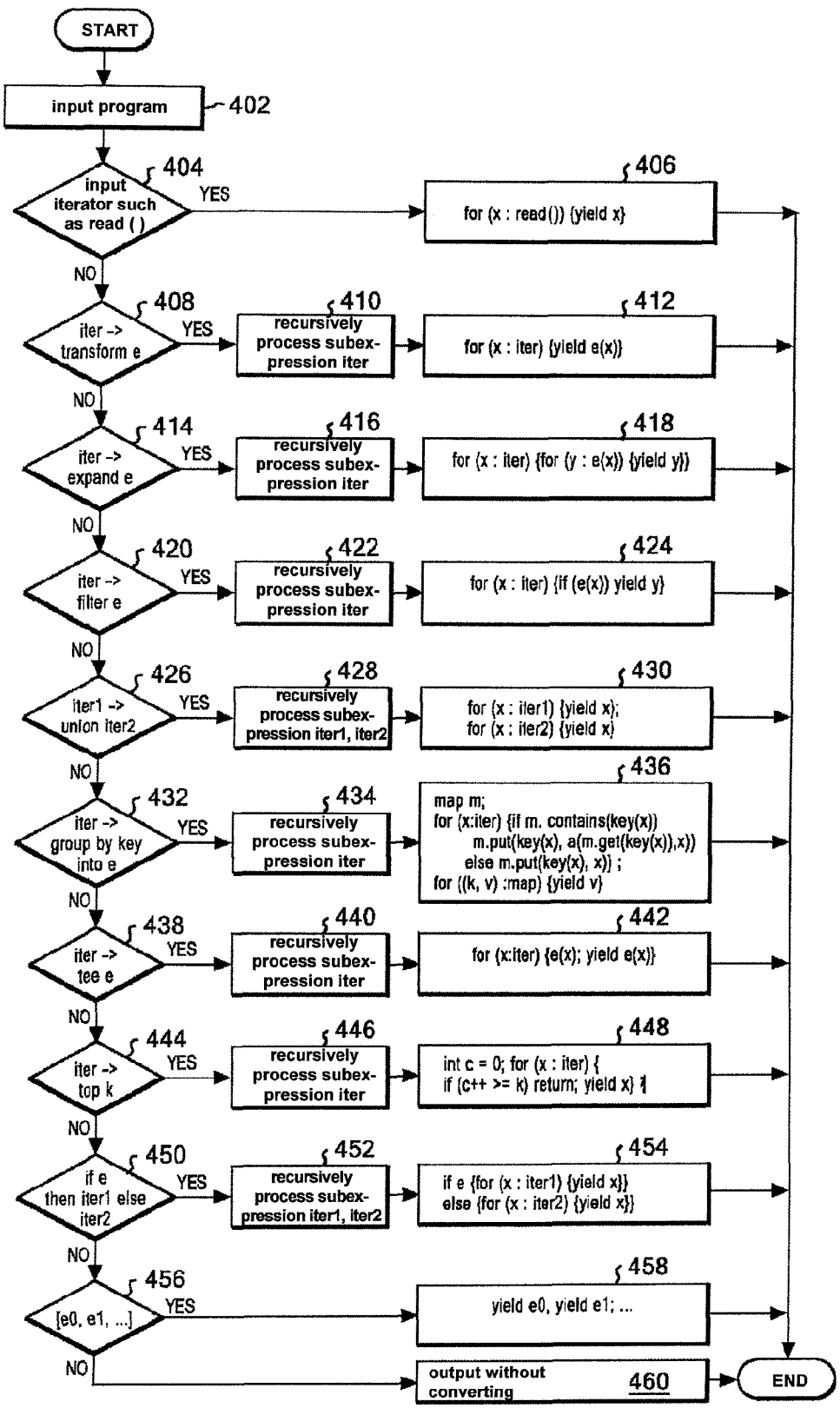
FIG. 4 is a diagram illustrating a processing flowchart that converts the iterator to a generator according to an embodiment of the present invention.

FIG. 4 is a diagram illustrating the processing flowchart that generates intermediate language code 308 where the iterator was converted to a generator in conversion module 306 according to an embodiment of the present invention. It should be understood that this process is called up for each statement.

Referring to FIG. 4, conversion module 306 reads one statement of source code (program) 304 in input program 402.

Conversion module 306 determines whether or not the statement that was read was input iterator such as read ( ) 404, and if so, it generates (x:read( )) {yield x} 406 and the process is terminated.

If the statement that was read is not input iterator such as read ( ) 404, conversion module 306 determines whether or not this statement that was read was iter-> transform e 408, and if so, it recursively processes subexpression iter 410, and generates for (x:iter) {yield e(x)} 412. The process is then terminated.

If the statement that was read is not iter-> transform e 408, conversion module 306 determines whether or not this statement that was read was iter-> expand e 414, and if so, it recursively processes subexpression iter 416, and generates for (x:iter) {for (y:e(x)) {yield y}} 418. The process is then terminated.

If the statement that was read is not iter-> expand e 414, conversion module 306 determines whether or not this statement that was read was iter-> filter e 420, and if so, it recursively processes subexpression iter 422, and generates for (x:iter) {if (e(x)) {yield y} 424. The process is then terminated.

If the statement that was read is not iter-> filter e 420, conversion module 306 determines whether or not this statement that was read was iter1-> union iter2 426, and if so, it recursively processes subexpression iter1, iter2 428, and generates for (x:iter1) {yield x}; for (x:iter2) {yield x} 430. The process is then terminated.

If the statement that was read is not iter1 -> union iter2 426, conversion module 306 determines whether or not this statement that was read was iter-> group by key into e 432, and if so, it recursively processes subexpression iter 434, and generates Map m; for (x:iter) {if m. contains (key(x)), m. put (key(x), a(m. get (key(x)),x)) else m. put (key (x), x)}; for ((k, v):map) {yield v} 436. The process is then terminated.

If the statement that was read is not iter-> group by key into e 432, conversion module 306 determines whether or not this statement that was read was iter-> tee e 438, and if so, it recursively processes subexpression iter 440, and generates for (x:iter) {e(x); yield e(x)} 442. The process is then terminated.

If the statement that was read is not iter-> tee e 438, conversion module 306 determines whether or not this statement that was read was iter-> top k 444, and if so, it recursively processes subexpression iter 446, and generates int c=0; for (x:iter) {if (c++>=k) return; yield x} 448. The process is then terminated.

If the statement that was read is not iter-> top k 444, conversion module 306 determines whether or not this statement that was read was if e then iter1 else iter2 450, and if so, it recursively processes subexpression iter1, iter2 452, and generates if e {for (x:iter1) {yield x}} else {for (x:iter2) {yield x}} 454. The process is then terminated.

If the statement that was read is not if e then iter1 else iter2 450, conversion module 306 determines whether or not this statement that was read was [e0, e1, . . . ] 456, and if so, it generates yield e0; yield e1; . . . 458, and the process is terminated.

If the read statement is not [e0, e1, . . . ] 456, conversion module 306 outputs the statement without converting 460, and the process is terminated.

Figure 5:
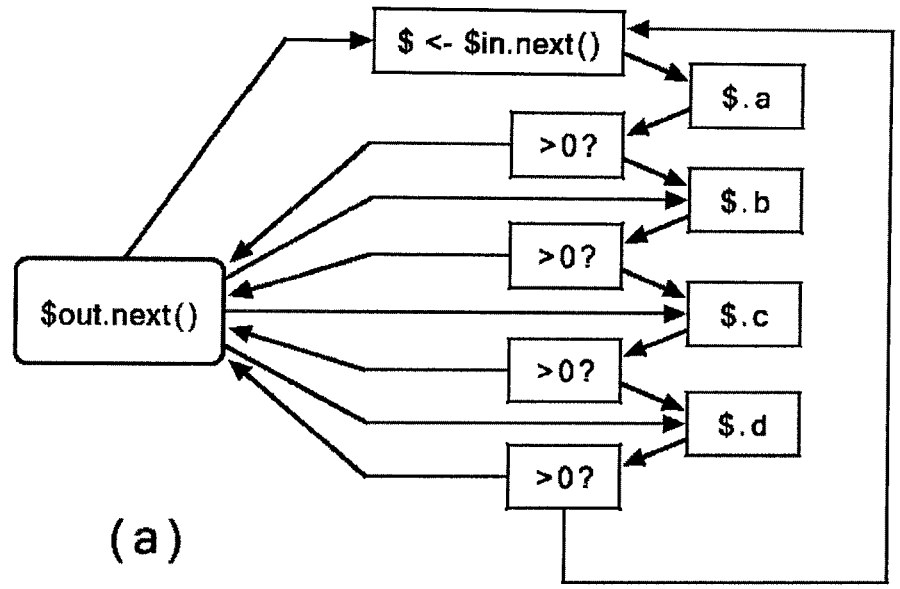
FIG. 5 is a diagram schematically illustrating processing that converts the iterator to a generator according to an embodiment of the present invention.
Figure 5:
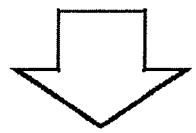
Figure 5:
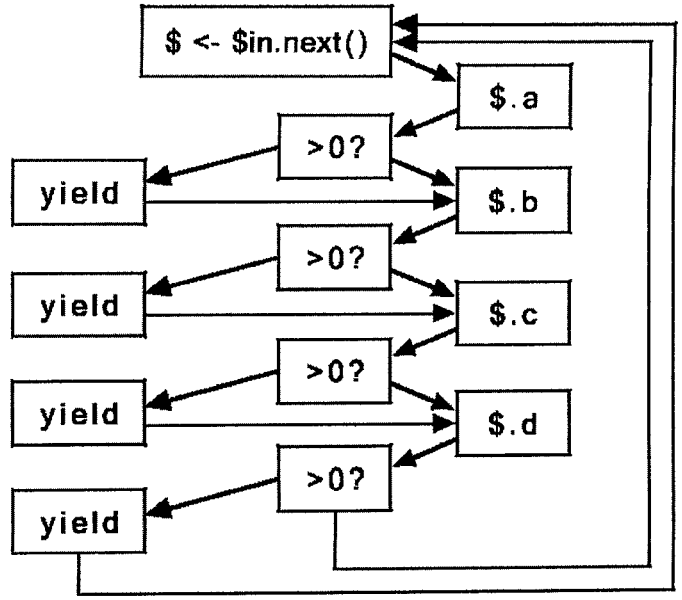

FIG. 5 is a diagram illustrating a specific example of converting the iterator to a generator. Referring to FIG. 5(*a*), next ( ) in the iterator process is described by the following code:

```
next ( ) {
    do {
        if (this. cur == null) {
            this. cur = $in. next ( ) ;
            if (this. cur == null) return null ;
            this. index = 0 ;
        }
        if (this. index ==0) x = this. cur. a ;
        if (this. index ==1) x = this. cur. b ;
        if (this. index ==2) x = this. cur. c ;
        if (this. index ==3) x = this. cur.d ;
        this. index++ ;
        if (this. index == 4) {
            this. cur = null ;
        }
    } while(x > 0) ;
    return x ;
}
```

According to the process of converting the iterator to a generator as illustrated in FIG. 4, the iterator process illustrated in FIG. 5(*a*) is converted to code that has a generator with various yields inserted as illustrated in FIG. 5(*b*). This is described by the following code:

```
for (cur. in $in) {
    if (cur. a > 0) yield cur. a ;
    if (cur. b > 0) yield cur. b ;
```

-continued

```
    if (cur. c > 0) yield cur. c ;
    if (cur. d > 0) yield cur. d ;
}
```

Figure 6:
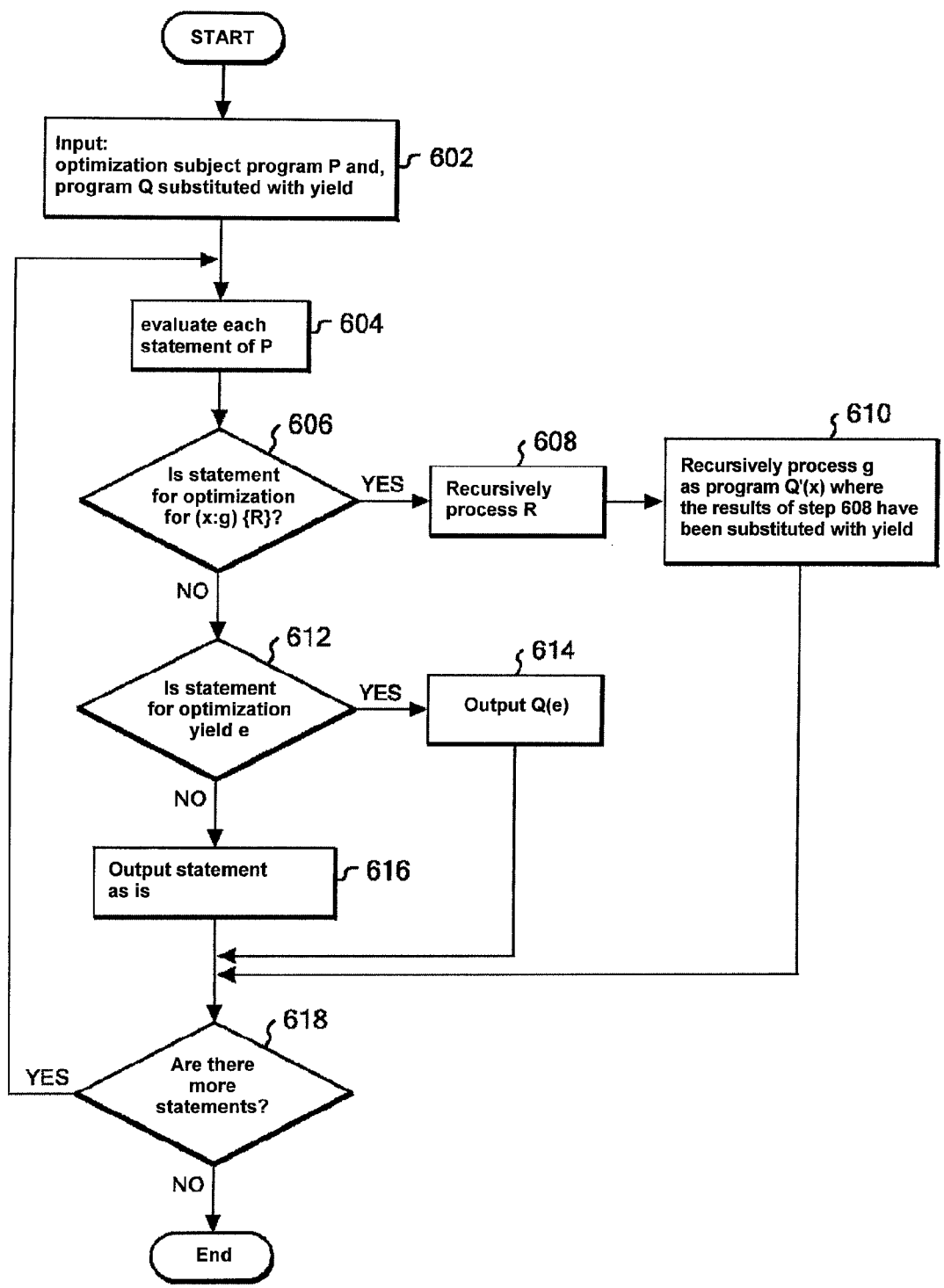
FIG. 6 is a diagram that illustrates a flowchart for an inlining process in an intermediate language that has a generator according to an embodiment of the present invention.

Referring to FIG. 6, the generator inlining process in conversion module 306 is described. Conversion module 306 inserts a program P subject to optimization and a program Q substituted with yield 602. The program P subject to optimization is prepared as the result of the process in FIG. 4. The program Q substituted with yield is referred to as the consumer.

The Jaql program, assumed in the present invention, is written by linking with an operator. Each operator becomes a consumer for the preceding operator. A series of operators that are linked are compiled into a single code by inline optimization. There are several types of operators that become the final consumer. For example, if the final operator is print, the stream output for standard output becomes inlined code, but if the final operator is a MapReduce operator, the output to API referred to as the Hadoop® OutputCollector becomes inlined code. The codes for each of the operators are extracted from the Jaql runtime source.

Referring to FIG. 6, conversion module 306 successively evaluates each statement of program P 604. In other words, conversion module 306 determines whether or not the statement is optimized for (x:g) {R} 606, and if so, it recursively processes R 608, and the result of 608 is recursively processed as program Q'(x) that has been substituted with yield 610. The process then determines whether or not there are more statements 618, and if there are no more statements, the process is terminated. If there are more statements, the process repeats and conversion module 306 successively evaluates each statement of program P 604.

If the optimized statement is not for (x:g) {R} 606, conversion module 306 determines whether or not the optimized statement is yield e 612, and if so, it outputs Q(e) 614. The process then determines whether or not there are more statements 618, and if there are no more statements, the process is terminated. If there are more statements, the process repeats and conversion module 306 successively evaluates each statement of program P 604.

If the statement optimized is not yield e 612, conversion module 306 outputs the statement as 612 and the process proceeds to step 618. The process then determines whether or not there more statements 618, and if there are no more statements, the process is terminated. If there are more statements, the process repeats and conversion module 306 successively evaluates each statement of program P 604.

Next, a specific example of this process is illustrated. First, it is assumed that the following code that converts the iterator to a generator is available.

```
for (JsonValue x : in ) {
    if (toInt (x) > 0) {
        yield x ;
        yield x ;
        yield x ;
    }
}
return;
```

Furthermore, the consumer is the following code.

```
for (JsonValue x : out) {
    println(x) ;
}
```

Therefore, the result of inlining the generator is as shown below.

```
for (JsonValue x : in ) {
    if ( toInt(x) > 0) {
        print In(x) ;
        println (x) ;
        println(x) ;
    }
}
return;
```

While this invention has been described based on the specific embodiments, this invention is not limited to these specific embodiments. It should be understood that various configurations and techniques such as modifications and replacements, which would be readily apparent to those skilled in the art, are also applicable. The present invention was described above based on an embodiment where Jaql language was used by the Hadoop® framework, but the present invention is not restricted to the Jaql language, and can be applied to other programming languages that have an iterator, such as Pig and Hive.

Furthermore, the packaging platform is not restricted to Hadoop® framework, and packaging is possible in a normal Web server environment or in a standalone system. The operating system is not restricted to Linux®, and any operating system that is compatible with the CPU that is used is acceptable, such as Microsoft Windows® 7, Windows XP®, Windows® 2003 server, and Apple Computer's Mac OS®.

Furthermore, the process of converting the iterator to a generator and the process of compiling the intermediate language can be performed on a different computer rather than in JobTracker.

Alternatively, it should be understood that the process of converting the iterator to a generator and the process of compiling the intermediate language can be performed in accordance with the present invention on a standalone computer.

What is claimed is:

1. A computer-implemented method for processing a programming language able to describe data conversion of data input by an iterator, said method comprising:
   converting iterator code of the programming language to a generator code in an intermediate programming language including a generator as an operator, wherein the intermediate programming language differs from the programming language, and wherein the generator code comprises one or more yield statements, and wherein the conversion comprises recursively processing a subexpression of said iterator code;
   reading a consumer code in the programming language;
   selecting at least a part of the consumer code to be overwritten by the generator code in response to the at least a part of the consumer code comprising a series of operators that are linked;
   overwriting the at least a part of the consumer code by substitution with said generator code converted from the iterator code, wherein one or more states embedded in the iterator are mapped to one or more program points of a program obtained from the overwriting; and
   compiling the program obtained from the overwriting, wherein said generator code is compiled using a compiler for the intermediate programming language, which is different from a compiler for the programming language for optimization of the generator code.

2. The method of claim 1, wherein:
   said programming language comprising said generator code is Jaql, and
   said method further comprises converting said converted code to Java byte code.

3. The method of claim 1, wherein overwriting at least a part of the consumer code comprises inline substitution of a yield expression in the definition of g with e in the statement "for (x:g) {e}", when said generator g is consumed by a form of said statement "for (x:g) {e}".

4. The method of claim 1, wherein the converting, the reading, and the overwriting are each executed by a job tracker in Hadoop framework.

5. The method of claim 1, wherein the converting, the reading, and the overwriting are each executed by a task tracker in Hadoop framework.

6. The method of claim 1, wherein the generator code for the series of operators that are linked is compiled into a single code by inline optimization.

7. A non-transitory article of manufacture tangibly embodying computer readable instructions which, when implemented, cause a computer to perform the steps of a method for processing a programming language able to describe data conversion of data input by an iterator, said method comprising:
   converting iterator code of the programming language to a generator code in an intermediate programming language including a generator as an operator, wherein the intermediate programming language differs from the programming language, and wherein the generator code comprises one or more yield statements;
   reading a consumer code in the programming language;
   overwriting code by inline substitution between said consumer code and said generator code converted from the iterator code, wherein one or more states embedded in the iterator are mapped to one or more program points of a program obtained from the overwriting; and
   optimizing the program obtained from the overwriting by compiling the program, wherein said generator code is compiled using a compiler for the intermediate programming language, which is different from a compiler for the programming language,
   wherein the iterator code of the programming language comprises a series of operators that are linked and wherein converting the iterator code of said programming language to a generator code in an intermediate language further comprises recursively processing a subexpression of said iterator code.

8. The article of manufacture according to claim 7, wherein:
   said programming language comprising said generator code is Jaql, and
   said method further comprises converting said converted code to Java byte code.

9. The article of manufacture according to claim 7, wherein the overwriting code by inline substitution further comprises substituting a yield expression in the definition of g with e in the statement "for (x:g) {e}", when said generator g is consumed by a form of said statement "for (x:g) {e}".

10. The article of manufacture according to claim 7, wherein the converting, the reading, and the overwriting are each executed by a job tracker in Hadoop framework.

11. The article of manufacture according to claim 7, wherein the converting, the reading, and the overwriting are each executed by a task tracker in Hadoop framework.

12. The article of manufacture according to claim 7, wherein compiling a series of iterator codes in the consumer code generates a single code.

13. A computer implemented system for processing a programming language able to describe data conversion of data input by an iterator, said system comprising:
 a memory;
 a processor communicatively coupled to the memory, and
 a module communicatively coupled to the memory and the processor, wherein said module is configured to perform a method comprising:
  converting an iterator code of the programming language to a generator code in an intermediate programming language including a generator as an operator by processing a subexpression of said iterator code recursively and inserting a yield in replacement, wherein the intermediate programming language differs from the programming language, and wherein the generator code comprises one or more yield statements;
  reading a consumer code comprising a series of linked iterator codes, each iterator code being a consumer for a preceding iterator code;
  overwriting the series of iterator codes by inline substitution between said consumer code and said generator code converted from the iterator codes, wherein one or more states embedded in the iterator codes are mapped to one or more program points of a program obtained from the overwriting; and
  compiling the program obtained from the overwriting, wherein said generator code is compiled using a compiler for the intermediate programming language for optimizing the generator code, which is different from a compiler for the programming language.

14. The system of claim 13, wherein:
 said programming language comprising said generator is Jaql, and
 said method further comprises converting said converted code to Java byte code.

15. The system of claim 13, wherein the overwriting the series of iterator codes by inline substitution further comprises substituting a yield expression in the definition of g with e in the statement "for (x:g) {e}", when said generator g is consumed by a form of said statement "for (x:g) {e}".

16. The system of claim 13, wherein compiling the series of iterator codes in the consumer code generates a single code.

* * * * *